(12) United States Patent
Gailloux et al.

(10) Patent No.: US 8,819,145 B1
(45) Date of Patent: Aug. 26, 2014

(54) SYSTEM AND METHOD FOR MESSAGE PRESENTATION CONSOLIDATION

(75) Inventors: Michael A. Gailloux, Overland Park, KS (US); Michael W. Kanemoto, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 521 days.

(21) Appl. No.: 11/868,590

(22) Filed: Oct. 8, 2007

(51) Int. Cl.
  *G06F 15/16* (2006.01)
  *G06F 17/30* (2006.01)
  *H04M 1/725* (2006.01)
  *H04L 12/58* (2006.01)

(52) U.S. Cl.
  CPC .............. *H04L 51/36* (2013.01); *H04L 51/066* (2013.01); *H04L 12/589* (2013.01)
  USPC ........... 709/206; 709/203; 709/205; 707/756; 707/760; 455/412.1

(58) Field of Classification Search
  CPC ...... H04L 51/36; H04L 51/066; H04L 12/589
  USPC .................. 709/206, 203, 205; 707/756, 760; 455/412.1
  See application file for complete search history.

(56) References Cited

U.S. PATENT DOCUMENTS

| | | | | |
|---|---|---|---|---|
| 6,330,589 | B1 * | 12/2001 | Kennedy ........................ | 709/206 |
| 7,194,516 | B2 * | 3/2007 | Giacobbe et al. .............. | 709/206 |
| 8,583,743 | B1 | 11/2013 | Gailloux et al. | |
| 2002/0087704 | A1 * | 7/2002 | Chesnais et al. ............... | 709/228 |
| 2002/0156871 | A1 * | 10/2002 | Munarriz et al. .............. | 709/219 |
| 2002/0165912 | A1 | 11/2002 | Wenocur et al. | |
| 2002/0183080 | A1 | 12/2002 | Poor et al. | |
| 2005/0044144 | A1 | 2/2005 | Malik et al. | |
| 2005/0251848 | A1 * | 11/2005 | Al-Janabi ...................... | 725/135 |
| 2006/0007466 | A1 | 1/2006 | Ben-Yehuda et al. | |
| 2006/0041684 | A1 | 2/2006 | Daniell et al. | |
| 2006/0075040 | A1 * | 4/2006 | Chmaytelli .................... | 709/206 |
| 2006/0271630 | A1 * | 11/2006 | Bensky et al. ................. | 709/206 |
| 2007/0010265 | A1 * | 1/2007 | Henderson et al. ............ | 455/466 |
| 2007/0143428 | A1 * | 6/2007 | Kumar et al. .................. | 709/206 |
| 2008/0059587 | A1 * | 3/2008 | Burtner et al. ................. | 709/206 |
| 2008/0153459 | A1 * | 6/2008 | Kansal et al. .............. | 455/412.1 |
| 2008/0215694 | A1 * | 9/2008 | Chen et al. ..................... | 709/206 |

OTHER PUBLICATIONS

Chung_Min Chen, Shan_Hung Wu, Phone Lin, System and Method for a United Multimedia Messaging Service Platform, U.S. Appl. No. 60/901,965, filed Feb. 16, 2007.*

Gailloux, Michael A., et al., Patent Application entitled, "System and Method for Message Gateway Consolidation," filed Oct. 8, 2007, U.S. Appl. No. 11/868,592.

Office Action dated Oct. 23, 2009, 20 pages, U.S. Appl. No. 11/868,592, filed Oct. 8, 2007.

Final Office Action dated May 4, 2010, 25 pages, U.S. Appl. No. 11/868,592, filed Oct. 8, 2007.

(Continued)

*Primary Examiner* — Viet Vu
*Assistant Examiner* — Herman Belcher

(57) ABSTRACT

The present disclosure includes a method for formatting messages that comprises receiving a plurality of messages that have been translated from a plurality of platform-specific message formats into a generic message format, indexing the pluralities of messages using at least one of a plurality of index fields, and threading the pluralities of messages into at least one of a plurality of threads using at least one of a plurality of threading fields.

18 Claims, 7 Drawing Sheets

(56) References Cited

OTHER PUBLICATIONS

Advisory Action dated Jul. 22, 2010, 3 pages, U.S. Appl. No. 11/868,592, filed Oct. 8, 2007.
Notice of Allowance and Fee(s) Due dated Jul. 1, 2013, U.S. Appl. No. 11/868,592, filed Oct. 8, 2007.
Final Office Action dated Aug. 27, 2012, U.S. Appl. No. 11/868,592, filed Oct. 8, 2007.
Office Action dated Mar. 13, 2012, U.S. Appl. No. 11/868,592, filed Oct. 8, 2007.
Advisory Action dated Nov. 19, 2012, U.S. Appl. No. 11/868,592, filed Oct. 8, 2007.

* cited by examiner

| Time Stamp | Subject | Sender | Message Platform | Size | Importance Indicator | Attachment | ...... |

320

322 — Mr X {VM} 3/28 10:01 AM: hey mr y where are you i thought we had a meeting this morning call me back 324 — Mr X {IM} 3/28 10:15 AM: where are you at
Mr Y {IM} 2/38 10:16 AM: im on the east coast this week. check this out.

326 — Mr Y {SMS} 3/28 10:17 AM:
You have new Picture Mail!

Click Go/View to see now.
<LINK>

Mr X {IM} 3/28 10:18 AM: you in the meeting
Mr Y {IM} 3/28 10:18 AM: yeah cant find our notes from last week
Mr X {IM} 3/28 10:18 AM: let me send them to you 328 — Mr X {e-mail} 3/28 10:20 AM:

From: Mr Z
Sent: Monday, March 19, 2007 10:01 AM
Subject: FW: Provide Feedback by 3 PM DT
Importance: High Morning all:
Please provide feedback by 3 PM today Mr Z Mr Y {IM} 3/28 10:22 AM: thanks

FIG. 4

SYSTEM AND METHOD FOR MESSAGE PRESENTATION CONSOLIDATION

CROSS-REFERENCE TO RELATED APPLICATIONS

This application includes subject matter related to U.S. patent application Ser. No. 11/868,592, filed Oct. 8, 2007, entitled "System and Method for Message Gateway Consolidation," by Michael W. Kanemoto, et al, which is herein incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are a variety of messaging technologies or platforms that allow users to communicate by sending messages among themselves. The message platforms may include email, voice mail, instant messaging (IM), short message service (SMS), Internet relay chat (IRC), and really simple syndication (RSS), among other current and future message platforms. Messaging may be one-to-one such as IM, where one user may send a message to only one recipient at a time. Messaging may be one-to-many such as email, where one user may send a message to many recipients at a time. The messaging may be unidirectional or bidirectional. A bidirectional messaging system may allow a recipient to reply to a received message such as in email. A unidirectional messaging system may only allow a recipient to view, but not respond to, a received message, such as a news feed from an RSS system. A message platform may include at least one transport network that transfers messages from one network node to another, at least one network server, also referred to as a message gateway (GW) that is dedicated to the messaging service, and one or more messaging protocols. For example, the email message platform may comprise Internet protocol (IP) networks as the transport network, one or more email gateways, and the messaging protocol simple mail transfer protocol (SMTP).

A client device in a message system is used by either a sender to send a message or a recipient to receive and view the message. The client device may be a desk phone, a computer, a personal digital assistant (PDA), or a mobile phone. Wireless devices are becoming a common choice of the client device for messaging. A wireless client device may support one or more message platforms, depending on the hardware and software the wireless client device may support. The more message platforms the wireless client device may support, the more computing resource and sophisticated software the client device may have to have.

SUMMARY

In a first embodiment, a method for formatting messages is provided that comprises receiving a plurality of messages that have been translated from a plurality of platform-specific message formats into a generic message format, indexing the plurality of messages using at least one of a plurality of index fields, and threading the plurality of messages into at least one of a plurality of threads using at least one of a plurality of threading fields.

In a second embodiment, a system for formatting messages for presentation is provided that comprises a processor, an inbound message presentation formatter, and an outbound message presentation formatter. The inbound message presentation formatter, when executed by the processor, is configured to receive a plurality of inbound messages in a generic message format, and to thread the inbound messages into at least one of a plurality of threads using one of a plurality of threading fields. The outbound message presentation formatter, when executed by the processor, is configured to receive an outbound message in the generic message format from a client device, and determine at least one receiving client device and a message format.

In a third embodiment, a system for consolidating platform-specific messages is provided that comprises a client device profile database configured with a plurality of client device profiles and a message format translator. The message format translator is configured to translate a first message in one of a plurality of platform-specific message formats into a second message in a generic message format for presentation at a local client device. The message format translator is also configured to translate a third message in the generic message format to a fourth message in one of the pluralities of platform-specific message formats for presentation at a remote client device. The system also includes a message presentation formatter configured to thread a plurality of messages that have been translated from the pluralities of platform-specific message formats into the generic message format into at least one thread based on at least one of a plurality of threading fields for presentation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an exemplary display of a thread of messages from different messaging platforms.

DETAILED DESCRIPTION

Figure 1:
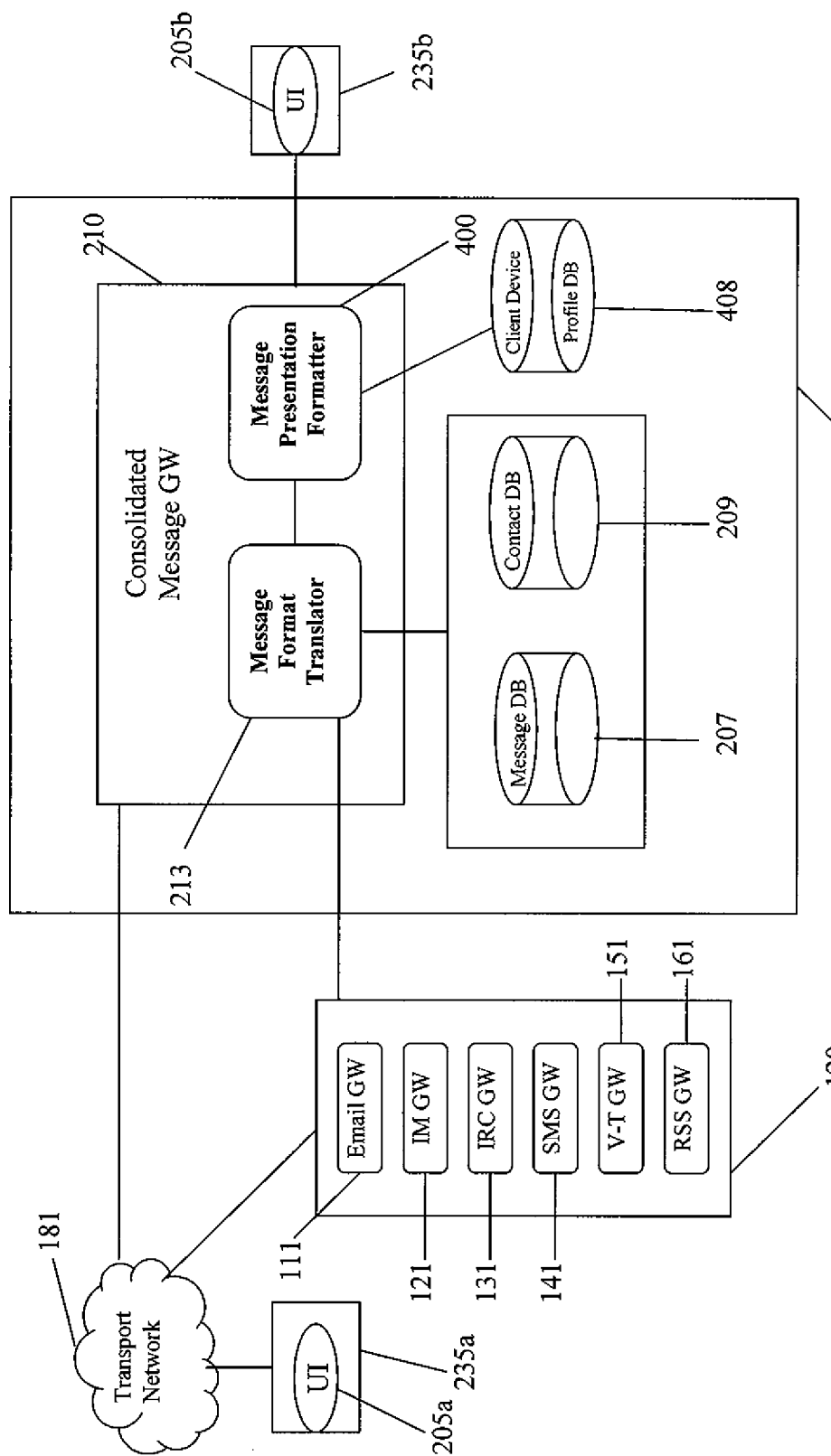
FIG. 1 illustrates an embodiment of a consolidated message network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A message platform supports a messaging system and related application. Each message platform may be unique, and the messaging protocol associated with a message platform may be referred to as a platform-specific messaging protocol. A user may have a separate session with a separate user interface (UI) for each message platform. For example, the user may start an email session with an email UI to read/send emails. The user then may start a separate session with a different UI for an IM chat with a friend. As wireless client devices become a more common choice for a consolidated communication device, it may be either impractical or inefficient for a wireless client device to be configured with the software and computing resources to support multiple message platforms.

The consolidated messaging solution may combine multiple platform-specific sessions into a single, generic session and allow a client device to present different types of messages using one generic message format. The consolidated messaging solution may combine multiple platform-specific message gateways into a generic message gateway. The consolidated messaging solution may include a message presentation formatter. The message presentation formatter may group the messages that have been translated from a plurality of platform-specific message formats into the generic message format into threads based on threading fields such as subject, key words, sender identity, receiver identity, location, time-date stamp, ad-hoc group designation, message importance level, and others. A message thread is a group of messages that are connected together or associated together by a common value of one or more threading fields. The messages may be grouped into a message thread to help the user locate related messages and contents. Viewing a message as part of a message thread may promote viewing the message in a context which may promote more rapid and rich understanding of the message contents. Message threads may be sent from a first device to a second device, for example from a first mobile phone to a second mobile phone, or from a personal digital assistant to a desktop computer. Message threads are assembled or composed by selecting messages stored in a database according to a constraint or constraints based on one or more values for threading fields. This mechanism allows threads to be constructed dynamically by users to promote viewing messages composed using different messaging platforms associated by thread field values rather than according to messaging platform.

FIG. 1 illustrates an embodiment of a combination 100 of a consolidated message network 201 coupled with a server cluster 120 comprising a set of platform-specific message gateways 111, 121, 131, 141, 151, and 161, a transport network 181, and client devices 235 with UIs 205. The consolidated message network 201 comprises a consolidated message gateway 210 and a set of databases including a message database 207, a contact database 209, and a client device profile database 408. The consolidated message gateway 210 in turn comprises a message format translator 213 and a message presentation formatter 400, and is coupled with a generic UI 205b on the client device 235b. According to at least one embodiment, the consolidated message gateway 210 may be accessible by the client device 235b via a communication link. The combination 100 shows a practical way to integrate the consolidated message network 201 into an existing, platform-specific message network. Alternatively, the consolidated messaging network 201 may be directly connected to the transport network 181, if there is not a need to integrate the consolidated message network 201 with an existing legacy message network. With the consolidated message network 201, the single UI 205b may allow a user to read and send the messages that belong to different message platforms.

The server cluster 120 is a networked group of application servers coupled with the transport network 181. The application servers within the server cluster 120 may be connected to each other via an internal network (not shown) or the transport network 181. One type of the application server is the message gateways 111, 121, 131, 141, 151, and 161. The message gateways 111, 121, 131, 141, 151, and 161 are platform-specific message gateways. The email gateway 111 may receive an email message, store the email in an email message database (DB), and forward it to a client device such as the client device 235a. The email gateway 111 may also translate from one format of the email to a different format suitable to a client device such as the client device 235a. The IM gateway 121 may receive an inbound or outbound instant message, store the message in a database, and forward the message to a client device such as the client device 235a. The IM gateway 121 may also translate from one format of an instant message to a different format suitable to a client device such as the client device 235a. An IRC gateway 131 may receive a chat message, store the message in a message database, and forward the message to a client device such as the client device 235a. The IRC gateway 131 may also translate from one format of a chat message to a different format suitable to a client device such as the client device 235a. The SMS gateway 141 is a back office application and/or device that may receive an inbound or outbound short message, store the message, and forward it to a client device such as the client device 235a in a wireless or a wireline network. The voice-text (V-T) gateway 151 may receive a voice mail in an audio format and translate it into a text format, or vice versa, based on the need of a client device such as the client device 235a. The voice-text gateway 151 may store the message in a message database and forward the message to a client device such as the client device 235a. The RSS gateway 161 may receive an RSS message, store the message in a message database, and forward the message to a client device such as the client device 235a. The RSS gateway 161 may also translate from one format of a RSS message to a different format suitable to a client device such as the client device 235a.

The transport network 181 may transport a message from one network node to another. The transport network 181 may comprise multiple networks based on different networking technologies. The different networking technologies may include Internet protocol (IP), asynchronous transfer mode (ATM), and public switched telephone network (PSTN), among others.

The client devices 235 may be configured to send and receive a message. The client devices 235 may be a wireless or wireline device, including a desk phone, a desktop computer, tablet computer, a mobile phone, a personal digital assistant (FDA), and a laptop computer. The client devices 235 may support one or more message platforms, depending on the hardware and software the client devices 235 may support. The client devices 235 may include a UI 205 for a user to view or send a message. The client device 235b with a generic UI 205b may be coupled to the consolidated message gateway 210 via an access network (not shown) or another transport network (not shown) similar to the transport network 181.

The UI 205b may be a consolidated user interface independent of a specific message platform. The consolidated UI 205b may promote a user accessing a plurality of platform-specific messages through the single UI 205b within one single session of a messaging client application. For example, the user may view his/her emails, IM messages, IRC messages, SMS messages and voice mails all through the single UI 205b. Without the consolidated UI 205b, the user may need to stop the previous session, and start a new session for a different type of message, using a different set of UI commands. In contrast to the platform-specific UI 205a, which may be an email UI, an SMS UI, an IRC UI, or an IM UI, the consolidated UI 205b may have fields that are a union of the fields of the platform-specific UIs including an email UI, an SMS UI, an IRC UI, and an IM UI. As a result of combining the fields of platform-specific messages, some fields for some messages in the consolidated UI 205b may have a null value. For example, the subject field for an IM message may be null, and the message in the subject field might be formatted and placed in the body of the IM message.

The consolidated message gateway 210 may receive a message in a platform-specific message format from the transport network 181 or from one of the platform-specific message gateways 111, 121, 131, 141, 151, and 161. The consolidated message gateway 210 performs a many-to-one mapping, translating the message in a platform-specific message format into a message in a generic message format. In one embodiment, an extensible markup language (XML)-based generic message format is adopted. For each inbound, platform-specific message, the consolidated message gateway 210 may process the message header and then translate the message body. The consolidated message gateway 210 may then format the translated message for presentation on the UI 205b of the client device 235b. The consolidated message gateway 210 may be implemented as a single module or multiple modules, depending on the design choice. The details of the message presentation formatter are illustrated in FIG. 4, and described in more detail later.

The message format translator 213 may receive an inbound platform-specific message from the transport network 181 or from one of the platform-specific message gateway 111, 121, 131, 141, 151, and 161, depending on the network configuration. The message format translator 213 may take as input the message header and build one or more index fields from the header information. The index fields may be used for the message database operations such as creating a new message record, and searching for, or deleting an existing message record. The message format translator 213 may take as input the message body and convert the platform-specific message contents into message contents in a generic message format. In one embodiment, an extensible markup language (XML)-based format is adopted as the generic message format. In such an embodiment, converting the message body into the XML-based format may comprise parsing the contents of the message body, adding XML tags and headers, formatting the message body into an XML-based format, and creating XML specific auxiliary files such as document type definition (DTD) files, among others.

The message format translator 213 may receive an outbound message in the generic message format from the client device 235b. In such a case, the message format translator 213 may convert the message body in the generic message format into a message in a platform-specific message format suitable to a recipient device such as the client device 235a. In the embodiment where the extensible markup language (XML)-based format is adopted as the generic message format, converting the message body from the XML format into a platform-specific message format may comprise parsing the contents of the message body in the XML-based format with help from auxiliary files such as DTD files as needed, stripping XML tags and headers, and formatting the message into the platform-specific message format.

The message database 207 may store messages in either a platform-specific message format or the generic message format. It may support database operations such as query, modify, add, and delete. The message database 207 may be implemented as a single physical database or multiple ones, depending on the design choice. It may use object-oriented database, relational database, or other future database technologies. Although the message database 207 may be closely coupled with other components of the consolidated message gateway 210, the present disclosure may allow a distributed configuration where the message database 207 or part of the message database 207 may be located remotely.

The contact database 209 contains a number of user contact records or entries. A contact record may comprise a contact name, a contact address, and multiple contact identities. A user may have multiple identities. For example, the user may have an email name, an IM screen name, a separate IRC chat name, an SMS account ID, and a PSTN phone number. These identities may be different from each other. The contact database 209 allows for a mapping from one identity to other identities of the user. The contact database 209 may be physically coupled with other components of the consolidated message gateway 210 or located remotely, depending on the design choice.

Figures 2, 3:
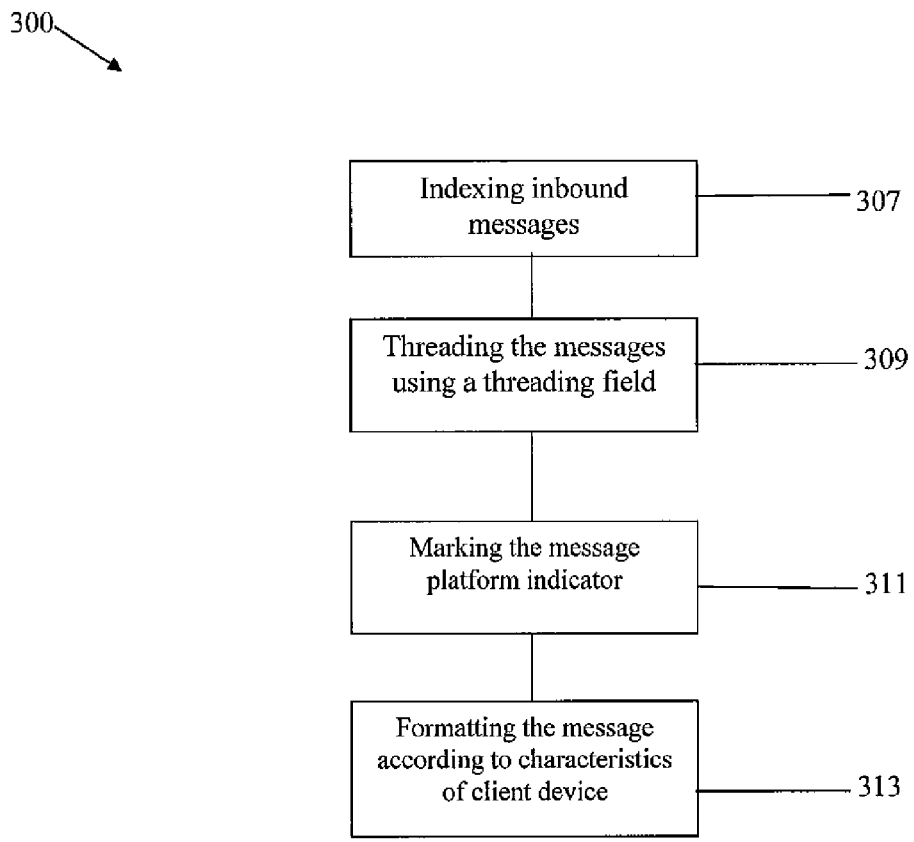
FIG. 2 illustrates an embodiment of a method for formatting messages for presentation.
FIG. 3 illustrates an embodiment of some exemplary index fields.

FIG. 2 illustrates an embodiment of a method 300 for formatting inbound messages to a generic message format for presentation. The method 300 comprises indexing the messages with one or more index fields at block 307, threading the messages using one of a plurality of threading fields at block 309, marking a message platform indicator for each message at block 311, and formatting the messages according to the characteristics of a client device at block 313.

The block 307 shows indexing the messages that have been translated from a plurality of platform-specific message formats to the generic message format. This may involve identifying index fields as display columns for presentation. FIG. 3 shows some of the example index fields that may include a from field, a to field, a subject field, a text body field, a time stamp field, an importance indicator field, a privacy field, a message size field, an attachment indicator field, and a message platform indicator field. A platform indicator is to indicate to the user the original platform of the message. For example, it may be a voice mail, an email, an IM message, or an IRC channel. One exemplary method of obtaining the index fields is to create a union of the index fields of each platform-specific message type. A message may have a null value for some of the combined index fields. For example, the subject field may have a null value in an SMS or IM message. An IRC or IM message may have a null value for the privacy field or the importance field.

The block 309 shows threading the messages. A message thread is a group of messages that are connected together by a commonly shared value, for example a common value for the same field that is of interest or importance to a user. The field, termed the threading field, for example, may be a conversation subject, a set of key words in message contents, a time-date stamp, a sender identity, or a sender location, among others. In an embodiment, an ad-hoc group designation may be a threading field. A user may be able to designate an arbitrary name or character string as a group designation to associate communications among others sharing an interest in the group or subject, for example "Labrador retriever show dogs" or "classic cars club." The messages are grouped into a thread to help the user locate related messages and contents. For example, a user may have four messages from different message platforms on the same subject matter, e.g., a business teleconference. The first message is an email the user received on a notification of the teleconference. The user replied with an IM message to confirm their attendance. Then the host of the teleconference left a voice message regarding a time and dial-in number change for the teleconference. The user then sent an SMS to invite a third party to the teleconference and to pass along the content of the voice mail. If the four messages, i.e., one email message, one voice mail, one IM message, and one SMS message, are threaded together, then the user can easily find the related items on a single client device. In this example, a conversation subject serves as the threading field to thread the four messages together. Other possible threading fields may include key words in the message body, an identity of a sender, location or presence of the sender, and a date time stamp, among others. The user may choose one threading field from multiple candidates and may change the threading field on a need basis. Threading messages may involve grouping and organizing the received, inbound messages based on the threading field chosen by the user.

The block 311 shows marking the messages. Some key fields may be marked with colors or represented with visual shapes for easy identification. For example, a platform indicator may indicate the original message platform, or type of a message, such as email, SMS, or voice mail. A color or a visual shape may help the user identify the message type, and thus, help the user decide on a message platform to use for an outbound reply message.

The block 313 shows formatting the multi-platform messages for display on a client device. Each client device has a set of characteristics that need to be taken into consideration for presentation. For example, the dimensions of a mobile phone display screen, i.e., its length and width, and the screen resolution need to be considered for presentation. Formatting the multi-platform messages includes formatting the messages according to the characteristics of the client device.

Turning now to FIG. 4, an exemplary message thread 320 is discussed. A thread of messages may be requested by the consolidated UI 205b, for example by specifying an index value or a threading field value, from the consolidated message gateway 210. The consolidated message gateway 210 may search the message database 207 for all messages that satisfy the constraint provided in the index value or the threading field value to generate the message thread 320. In an embodiment the consolidated message gateway 210 may search for messages having a time-date stamp based on the most recent two days or some other period of time. In another embodiment, however, the user may specify an oldest time-date stamp or a time period to constrain the search. The consolidated message gateway 210 bundles, packages, or otherwise associates the messages found in the message database 207 that match the constraints as a thread and sends this thread to the consolidated UI 205b, and the consolidated UI 205b displays the thread.

The exemplary message thread 320 includes a plurality of messages. A first message 322 indicates the message was sent by Mr X as a virtual message at 10:01 AM March 28. The content of the virtual message is indicated. A second message 324 combines two instant messaging messages, indicating senders, the message platform, the time, and the message contents. The second message 324 is shown consolidating two instant messaging messages because this is the character of instant messaging sessions. A third message 326 is an SMS message and indicates the sender, the message platform, the time and date, and the content. A fourth message 328 is an email message and indicates the sender, the message platform, the time and date, and the content. The exemplary message thread 320 provides a simple consolidated view of related messages associated with disparate messaging platforms. In an embodiment, longer messages may not be fully displayed at a top level. In this case, a leading portion of the message may be displayed, and the user may select the message to display the remainder of the message. In an embodiment, portions of the message thread 320 may be displayed by the consolidated UI 205b in different colors to draw attention to key information, for example to the indication of original message platform, to an indication of message importance, to a time-date stamp. Without the benefit of the message thread 320, a user may be required to view these messages in four different applications and create the association provided by the threading constraints manually. The number of messages and origination message platforms in the exemplary message thread 320 is only an example and may be different in other embodiments.

The several messages that are selected from the message database 207 based on a first constraint can be selected from the message database 207 according to other constraints. For example, a first thread produced by the consolidated message gateway 210 in response to a first constraint may comprise messages A, B, and C selected from the message database 207. A second thread produced by the consolidated message gateway 210 in response to a second constraint may comprise messages B, D, and F selected from the message database 207. The first and second constraints may be different values for a common threading field or may be directed to different threading fields. For example, the first and second constraints may be different sender identities. Alternatively, the first constraint may be a sender identity while the second constraint may be a time-date stamp value.

The display on the consolidated UI 205b can promote viewing a message in a context of other related messages, which can enrich and strengthen the user understanding of the message. At a glance, the user is able to see the dates and times of related messages in the message thread 320 and at least a portion of the message content. Additionally, the consolidated UI 205b may send the message thread 320 to another client device 235.

Figure 5:
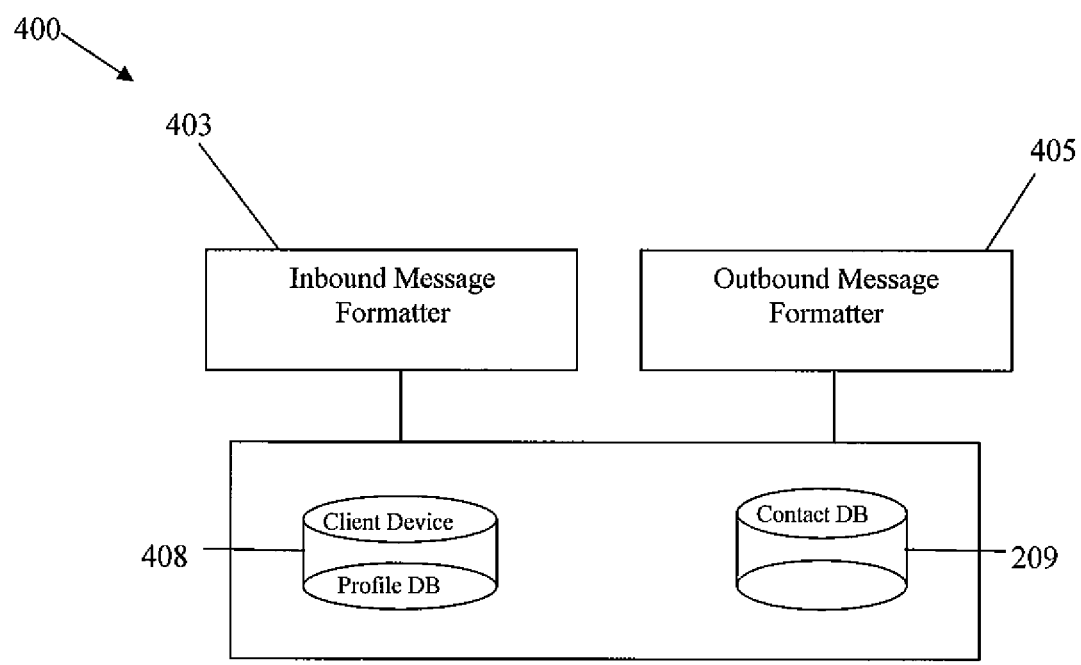
FIG. 5 illustrates an embodiment of a message presentation formatter.

FIG. 5 illustrates an embodiment of a message presentation formatter 400. The formatter 400 may comprise an inbound message formatter 403, and an outbound message formatter 405, coupled with a contact database 209 and a client device profile database 408.

The inbound message formatter 403 may receive from the message format translator 213 of FIG. 1 a plurality of inbound messages in a generic message format. The index fields for the message and the threading field may also come with the messages in the generic message format. The inbound message formatter 403 may retrieve a client device profile from the client device profile database 408. The client device profile may contain a set of characteristics of the client device and the characteristics may include display screen width, height, number of colors, and resolution, memory, processor capability, and operating system on the client device, among others. The inbound message formatter 403 may put the index fields as the display heading, group the messages according to a chosen threading field, and fitting the messages into a display screen of the client device, according to the characteristics of the client device.

The outbound message formatter 405 receives an input message from a user that may be a reply message to a received message or a new, outgoing message. The outbound message formatter 405 may allow the user to send multiple copies of the outbound message if the recipient of the message has multiple receiving devices, one copy per receiving device. In addition, the outbound message formatter 405 may allow the user to select a format for each copy of the message. Each copy of outbound message may be in the generic message format, or a platform-specific message format, depending on the message format each of the recipient devices may support and a preferred format that the recipient may have specified. For example, if the recipient has three receiving devices, a mobile phone for SMS message, a desktop for email message, and a wireless PDA for IM message, then the user may have a copy of the outbound message sent to the recipient desktop in the generic message format, to the recipient mobile phone in a native SMS format, and to the recipient PDA in a specific IM format. The choice of the outbound message format for the user may be specified in a record of the contact database 209 or other data store, depending on the design choice. Each copy of the outbound message is first sent to the message format translator 213 to be translated from the generic message format to a platform-specific message format if there is a need, and to be saved in a message database.

The client device profile database 408 contains a number of client device profile records or entries. The index fields for the database may include a client device identification (ID), a device type, and a device location, among others. A record of the client device profile database may include characteristics such as display screen width, height, and resolution, memory, processor capability, and operating system on the client device, among others. The record may also include the messaging capabilities supported on the client device such as supported messaging and networking protocols, content representation languages, and supported services. The client device profile database 408 may be physically coupled with other components of message presentation formatter 400 or located remotely, depending on the design choice. The contact database 209 is illustrated in FIG. 1 and described earlier.

The message presentation formatter 400 may be implemented as a single module, multiple modules, or in combination with other system or system components, depending on the design choice and the network configuration. The message presentation formatter 400 may, in part or in its entirety, function as part of a server application, or as part of a client application, also depending on the design choice and the capabilities of a client device.

Figure 6:
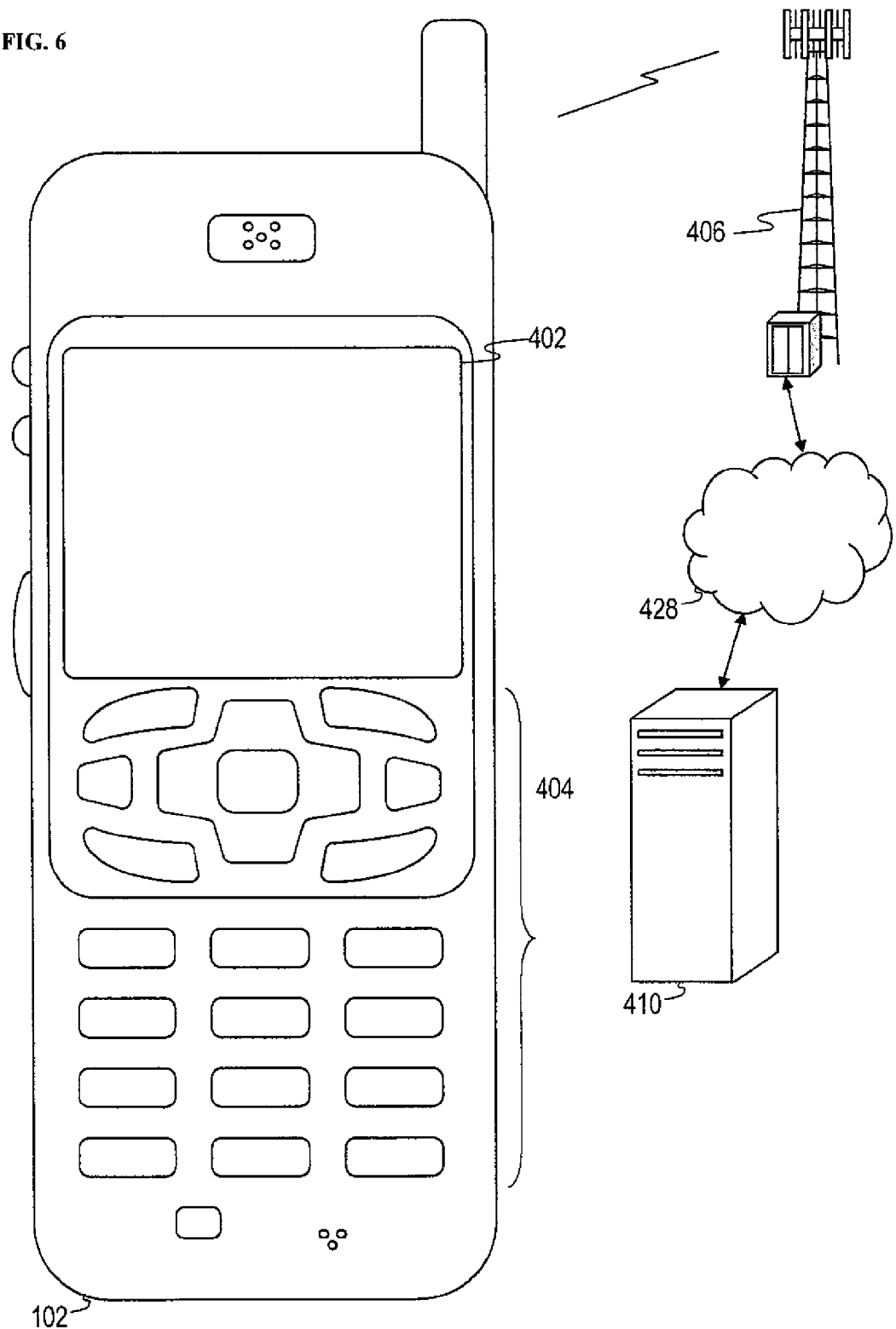
FIG. 6 illustrates an embodiment of a wireless communications system.

FIG. 6 shows a wireless communications system including the handset 102. FIG. 6 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 402 to show a web page. The web page may be obtained via wireless communications with a cell tower 406, a wireless network access node, a peer handset 102 or any other wireless communication network or system. The cell tower 406 (or wireless network access node) is coupled to a wired network 428, such as the Internet. Via the wireless link and the wired network, the handset 102 has access to information on various servers, such as a server 410. The server 410 may provide content that may be shown on the display 402. Alternately, the handset 102 may access the cell tower 406 through a peer handset 102 acting as an intermediary, in a relay type or hop type of connection.

Figure 7:
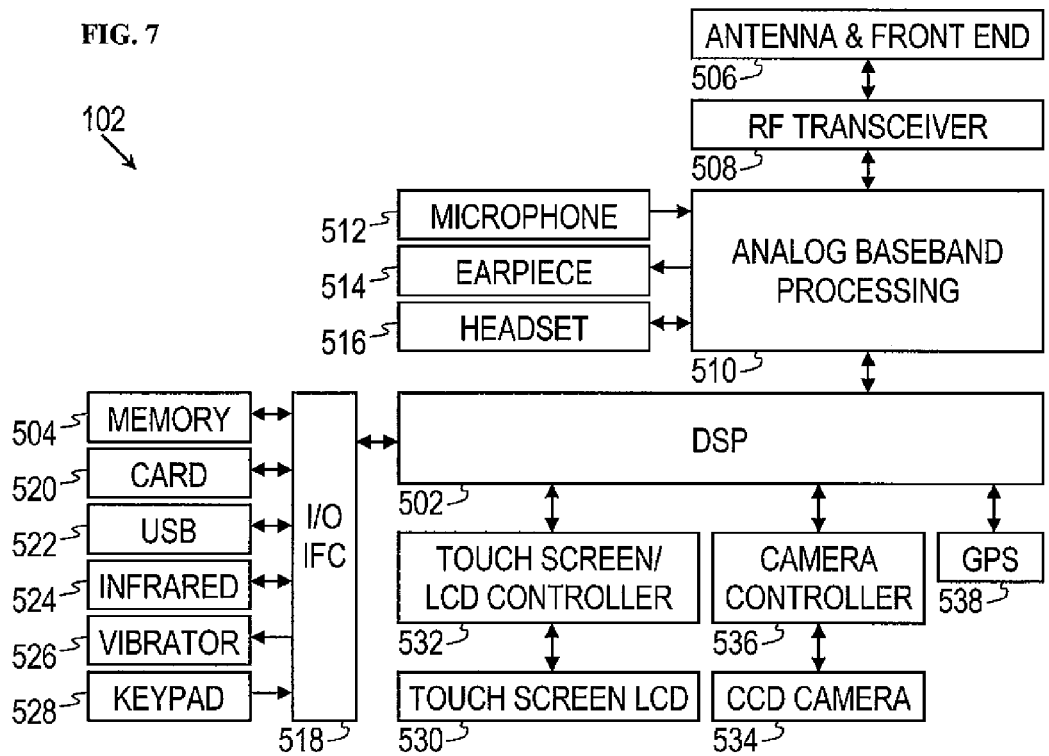
FIG. 7 illustrates an embodiment of a handset in a block diagram

FIG. 7 shows a block diagram of the handset 102. While a variety of known components of handsets 102 are depicted, in an embodiment a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RE) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RE power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than Charge Coupled Device cameras may be employed. Various other peripherals may also be included to provide additional functions, e.g., radio and television reception.

Figure 8:
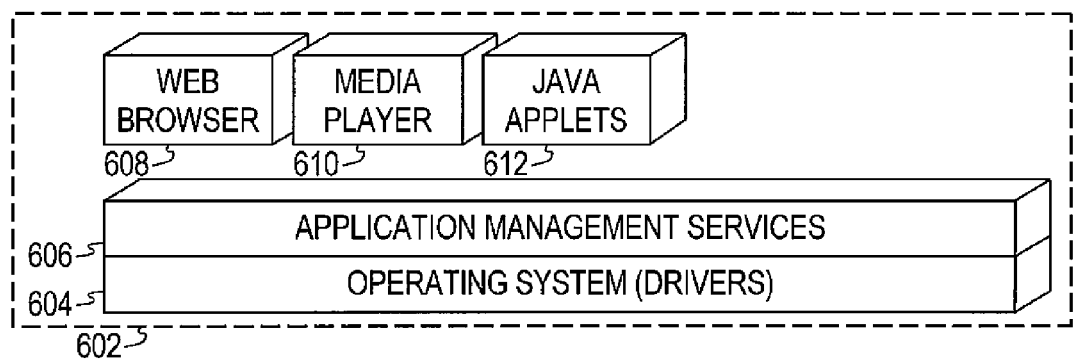
FIG. 8 illustrates an embodiment of a handset software environment.

FIG. 8 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 8 are a web browser application 608, a media player application 610, and JAVA applets 612. The web browser application 608 configures the handset 102 to operate as a web browser, allowing a user to enter information into forms and select links to retrieve and view web pages. The media player application 610 configures the handset 102 to retrieve and play audio or audiovisual media. The JAVA applets 612 configure the handset 102 to provide games, utilities, and other functionality.

Figure 9:
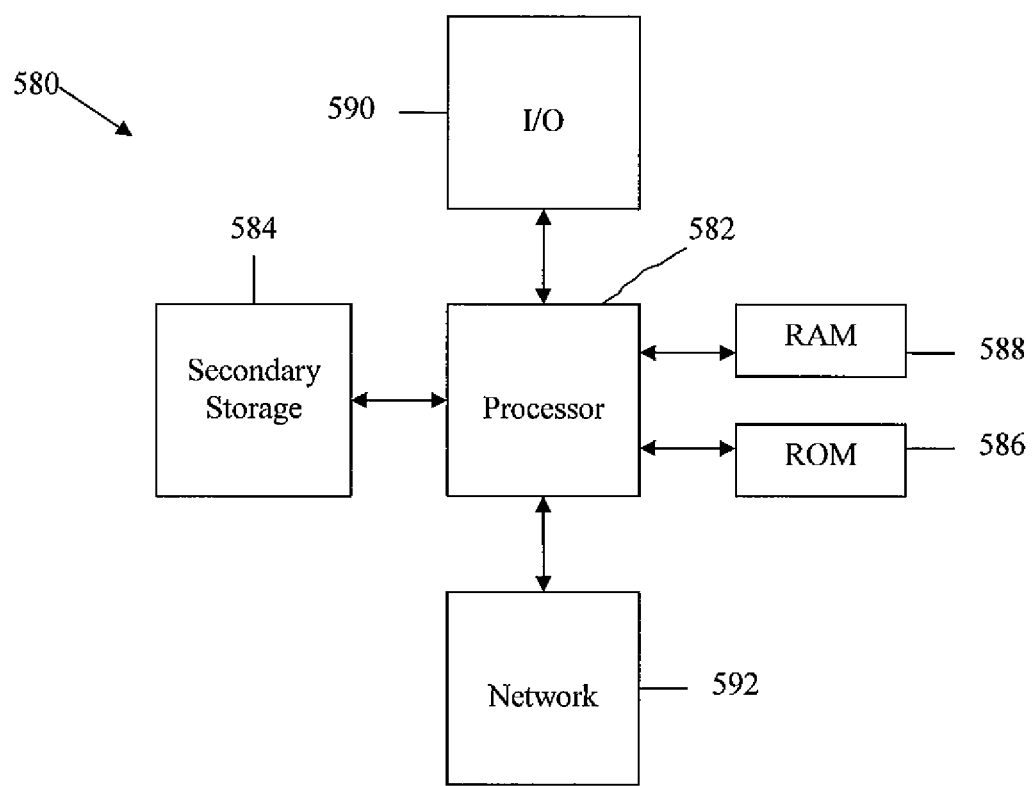
FIG. 9 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for formatting messages, comprising:
   receiving, by a database, a plurality of messages that have been translated by a consolidated message gateway stored on a non-transitory computer-readable storage medium and executed by a processor from a plurality of platform-specific message formats into a generic message format, wherein the generic message format comprises one of an extensible markup language (XML), a hypertext markup language (HTML), or a standard generalized markup language (SGML);
   indexing, by the consolidated message gateway, the plurality of messages using at least one of a plurality of index fields;
   receiving, by the consolidated message gateway, at least one of a plurality of threading fields;
   searching, by the consolidated message gateway, the database using the at least one of a plurality of index fields and based on the at least one of a plurality of threading fields;
   threading, by the consolidated message gateway, the plurality of messages in the database that have a common value in the at least one of a plurality of threading fields into at least one of a plurality of threads, wherein the at least one of the plurality of threads comprises message contents in the generic message format of each of the plurality of messages that have been translated from the plurality of platform-specific message formats into the generic message format;
   sending, by the consolidated message gateway, the at least one of the plurality of threads to a client device for display in a consolidated user interface, wherein the consolidated user interface comprises a plurality of fields that are a union of a plurality of fields of each of a plurality of platform-specific user interfaces associated with the plurality of platform-specific message formats, and wherein the consolidated user interface is independent of the plurality of platform specific user interfaces; and
   sending, by the consolidated message gateway, a copy of an outgoing message to each of a plurality of client devices associated with a recipient, wherein the plurality of client devices is selected by a sender, and wherein each copy of the outgoing message sent to one of the plurality of client devices is in a different message format selected by the sender.

2. The method of claim 1, further comprising formatting, by a message formatter stored on a non-transitory computer-readable storage medium and executed by a processor, the plurality of messages for presentation according to a plurality of device characteristics of a client device.

3. The method of claim 1, further comprising marking, by a message formatter stored on a non-transitory computer-readable storage medium and executed by a processor, a first one of the plurality of platform-specific message formats with a first visual indicator and a second one of the plurality of platform-specific message formats with a second visual indicator.

4. The method of claim 1, wherein the messages comprise a first message, a second message, and a third message; wherein a first thread of the plurality of threads comprises the first message and the second message; and wherein a second thread of the plurality of threads comprises the first message and the third message.

5. The method in claim 1, wherein indexing, by the consolidated message gateway, the plurality of messages comprises creating a plurality of message presentation columns using at least some of the plurality of index fields comprising a date time stamp, a subject title, a sender name, a message platform indicator, an importance indicator, a message size, and an attachment indicator.

6. The method in claim 1, wherein the plurality of threading fields comprises a sender identity, a sender presence, a sender location, at least one key word, a time-date stamp, an ad-hoc group designation, and a subject.

7. The method in claim 1, wherein threading, by the consolidated message gateway, the plurality of messages comprises grouping together a subset of the plurality of messages that match the at least one of the plurality of threading fields.

8. The method of claim 1, wherein the plurality of platform-specific message formats comprises an email, a voice mail, a short message service (SMS), an instant message (IM), an Internet relay chat (IRC), and a really simple syndication (RSS).

9. A system for formatting messages for presentation, comprising:
   a processor;
   an inbound message presentation formatter, when executed by the processor, configured to:
      receive one of a plurality of threading fields,
      receive a plurality of inbound messages that have been translated from a plurality of platform-specific message formats into a generic message format, wherein the generic message format comprises one of an extensible markup language (XML), a hypertext markup language (HTML), or a standard generalized markup language (SGML),
      thread the plurality of inbound messages into at least one of a plurality of threads using the one of a plurality of threading fields, wherein the at least one of the plurality of threads comprises message contents in the generic message format of each of the plurality of messages that have been translated from the plurality of platform-specific message formats into the generic message format, and
      send the at least one of the plurality of threads to a client device for display in a consolidated user interface, wherein the consolidated user interface comprises a plurality of fields that are a union of a plurality of fields of each of a plurality of platform-specific user interfaces associated with the plurality of platform-specific message formats, and wherein the consolidated user interface is independent of the plurality of platform specific user interfaces; and
   an outbound message presentation formatter, when executed by the processor, configured to:
      receive an outbound message in the generic message format from the client device, and
      send a copy of the outgoing message to each of a plurality of client devices associated with a recipient, wherein the plurality of client devices is selected by a sender, and wherein each copy of the outgoing message sent to one of the plurality of client devices is in a different message format selected by the sender.

10. The system of claim 9, further comprising a client device profile database stored on a storage device configured with a plurality of the client device profiles.

11. The system of claim 10, wherein each of the plurality of client device profiles comprises a device identity, a screen width, a screen height, a screen resolution, and a display device type.

12. The system of claim 9, wherein the inbound message presentation formatter is configured to at least one of format the plurality of inbound messages for presentation at the client device using a client device profile of the client device and allow a user to sort the plurality of inbound messages using one of a plurality of index fields.

13. The system of claim 9, wherein the client device comprises one of a mobile phone, a personal digital assistant, and a laptop computer.

14. A system for consolidating platform-specific messages, comprising:
   a client device profile database configured with a plurality of client device profile records;
   a message format translator configured to:
      translate a first message in one of a plurality of platform-specific message formats into a second message in a generic message format for presentation at a local client device, wherein the generic message format comprises one of an extensible markup language (XML), a hypertext markup language (HTML), or a standard generalized markup language (SGML), and
      translate a third message in the generic message format to a fourth message in one of the plurality of platform-specific message formats for presentation at a remote client device; and
   a message presentation formatter configured to:
      receive at least one of a plurality of threading fields,
      thread a plurality of messages that have been translated from the plurality of platform-specific message formats into the generic message format into at least one thread based on the at least one of a plurality of threading fields for presentation at the local client device, wherein the at least one of the plurality of threads comprises message contents in the generic message format of each of the plurality of messages that have been translated from the plurality of platform-specific message formats into the generic message format,
      send the at least one of the plurality of threads to a client device for display in a consolidated user interface, wherein the consolidated user interface comprises a plurality of fields that are a union of a plurality of fields of each of a plurality of platform-specific user interfaces associated with the plurality of platform-specific message formats, and wherein the consolidated user interface is independent of the plurality of platform specific user interfaces, and
      send a copy of an outgoing message to each of a plurality of client devices associated with a recipient, wherein the plurality of client devices is selected by a sender, and wherein each copy of the outgoing message sent to one of the plurality of client devices is in a different message format selected by the sender.

15. The system of claim 14, wherein the system is coupled with a contact database configured to map a first identity of a user associated with a first message format to a second identity of the user associated with a second message format.

16. The system of claim 15, wherein the client device database contains a client device profile record for the local client device and a client device profile record for the remote client device.

17. The system of claim 14, wherein the message format translator and the message presentation formatter are in two separate devices or combined into one device.

18. The method of claim 1, further comprising sending the at least one of the plurality of threads from the client device to another client device.

* * * * *